United States Patent

[11] 3,590,537

[72] Inventors: Erich Konigstein Hennig;
Wolfgang Kammermayer, both of Frankfurt, Germany
[21] Appl. No. 873,945
[22] Filed Nov. 4, 1969
Division of Ser. No. 634,353, April 27, 1967, Patent No. 3,521,411
[45] Patented July 6, 1971
[73] Assignee Alfred Teves Maschinen-und Armaturenfabrik KG
Frankfurt am Main, Germany
[32] Priority May 21, 1966, Sept. 2, 1966
[33] Germany
[31] T 31 199

[54] DISC-BRAKE CLEANING APPARATUS
8 Claims, 6 Drawing Figs.
[52] U.S. Cl. .................................................. 51/241 S, 51/106, 51/132, 51/354, 51/111
[51] Int. Cl. .............................................. B24b 19/00
[50] Field of Search ................................. 51/281 SF, 241, 241 S, 258, 281, 161, 132, 134, 255, 111

[56] References Cited
UNITED STATES PATENTS
| 2,462,176 | 2/1949 | Fryar | 51/241 S |
| 3,007,290 | 11/1961 | Davis et al. | 51/255 |
| 3,521,411 | 7/1970 | Hennig et al. | 51/281 SF |

Primary Examiner—William R. Armstrong
Attorney—Karl F. Ross

ABSTRACT: Apparatus for cleaning the braking surface of a brake disc without dismounting the disc or completely dismantling the brake installation is disclosed. A pair of grinding chocks or pads having a grindstone plaque or layer mounted upon a backing plate via a layer of thermal insulation is substituted for the brakeshoes or is retained against the discs and pressed against the area to be cleaned while the disc is rotated via an auxiliary motor frictionally engaging the periphery of the disc or through the axle of the disc.

PATENTED JUL 6 1971

INVENTORS
ERICH HENNIG
WOLFGANG KAMMERMEYER
BY
Karl F. Ross
ATTORNEY

INVENTORS
ERICH HENNIG
WOLFGANG KAMMERMEYER
BY
Karl G. Ross
ATTORNEY

DISC-BRAKE CLEANING APPARATUS

This application is a division of application Ser. No. 634,353, now Pat. 3,521,411 issued July 21, 1970.

Our present invention relates to the refinishing, cleaning and/or grinding of a brake disc and, more particularly, to the removal of rust, dirt or other contaminants deposited upon or accumulated by the annular braking faces of the disc.

A conventional disc brake installation generally comprises a brake disc coupled to the wheel of an automotive vehicle and passing through a fixed or axially movable yoke, mounted upon the axle housing, which is provided with a pair of brakeshoes, hydraulically, pneumatically or mechanically against the annular braking faces of the disc by an actuating means. In some cases, each of the brakeshoes can be provided with a respective wheel-brake cylinder and the yoke can be fixed with respect to the disc In other arrangements, the brakeshoes are urged by a scissor linkage pivotally mounted on the yoke against the disc. In yet another system, the yoke itself is axially shiftable and one of the brakeshoes is mounted directly thereon while the other brakeshoes is biased by a hydraulic wheel cylinder against its braking face, the reaction force drawing the other brakeshoe against the other braking face. Since cooling of the disc is generally accomplished simply by permitting air to come into contact with the disc as it emerges from the yoke, often there is no protection against penetration of dust or water into the inner parts of the installation and from coming into contact with the disc; as a consequence, the braking faces of the disc accumulate contaminants or develop a rust layer especially when the vehicle is not used frequently or has been in storage for some time. This problem also arises when a relatively long period lapses between completion of the vehicle and its delivery to the vehicle purchaser or operator.

One of the inconveniences arising from the contamination or rusting of the braking faces of the disc is that the braking faces are roughened thereby and causes considerable wear of the brake linings. In general, the brake linings are composed of a material (e.g. asbestos composition) having a high coefficient of sliding friction, good resistance to oil and water, and high compressive strength, although the resistance of the composition to frictional and abrasive wear is limited. As a result, the replacement of the brakeshoe or its lining becomes a necessity in short order. Furthermore, when the driver of the vehicle is confronted with a situation in which the vehicle has to be slowed substantially instantaneously, he actuates the brake and the abrupt attempt at stopping the vehicle in this fashion can give rise to dangerous consequences when the braking faces of the disc are contaminated or rusted in the manner described. Thus, the brakeshoes are pressed against the disc and suddenly seize the rusty or contaminated faces with an undetermined effect because the surface accumulations, if oily in nature, prevent frictional braking of the disc, whereas rusty surfaces may cause premature seizing and locking of the brakes.

It has, therefore, been necessary to check the brake disc regularly and often, especially when vehicles are stored for prolonged periods or have not been used for some time. When it is discovered that the brake disc is contaminated or rusted, the cleaning and polishing of the disc is essential if the aforementioned dangers are to be avoided. To clean and polish the brake disc, it has been necessary heretofore to remove the wheel and then dismantle the installation and withdraw the brake disc from the assembly. The brake disc is then mounted in a grinding apparatus independently of the vehicle or the brake assembly and frequently must be returned to the factory for proper surface grinding to remove dust, dirt, rust and like accumulations. Both the dismantling and grinding procedures are long and tedious and the reassembly of the brake system requires centering, alignment and readjustment, involving skilled mechanics and other highly paid personnel.

It is, therefore, the principal object of the present invention to provide a system for cleaning and polishing of a brake disc whereby the aforementioned disadvantages can be avoided.

This object and others which will become apparent hereinafter are attained, in accordance with the present invention, by a system which involves juxtaposing with the annular braking faces of the brake disc of a disc brake installation, a pair of grinding pads whose radial extent preferably exceeds the radial extent of the brakeshoes, thereby ensuring complete resurfacing of the braking faces, and thereafter axially applying these grinding pads against the brake faces without disassembling the brake installation in its entirety or dismantling and removing the brake disc. The brake disc can be rotated, in accordance with the present invention, while axial pressure applies the grinding pads to the braking faces, thereby performing a resurfacing of the latter which removes all rust and other contaminants.

In accordance with one aspect of this invention, the normal brakeshoes of the installation, whose yoke can be provided with access openings permitting removal without disassembling the yoke, are removed and a pair of grinding chocks or pads whose configuration and outlines resemble those of the brakeshoes is inserted. Thus, the grinding chocks may be provided with backing plates of a material similar to that used to support the brake linings and, in place of brake linings, a ceramic grinding pad can be applied to each of the braking plates. In this case, the rotation of the disc is effected by driving the latter through its axle or by rotating the disc by frictional engagement with its periphery via an auxiliary motor.

According to a feature of this aspect of the invention, the wheel of the associated disc can be remounted and grinding effected by driving the vehicle backwardly and forwardly while applying the brakes lightly and thereafter somewhat strongly. The grinding chocks will effectively abrade any contaminants remaining upon the disc while serving to brake the vehicle. Here, too, the radial extent of the grinding pads exceeds the radial extent of the brake linings, thereby ensuring the grinding, cleaning and polishing of a swath along each of the braking faces which is radially wider than the swath swept by the brakeshoes during normal braking operation.

We have found it to be advantageous to mount the grinding layer on the backing plate via a thermally insulating layer of a synthetic resin and to secure the grinding pad to this layer via an adhesive and secure the layer, in turn, to the backing plate via further layer of adhesive. The grinding pads are composed of a bonded abrasive such as silicon carbide (e.g. carborundum), tungsten carbide or the like, the abrasive particles being held together with an organic binder such as bakelite resin or with a ceramic binder (e.g. sintered graphite or clay). The coarseness of the grinding pad is selected, in accordance with this invention, in dependence upon the amount of contamination or accumulation formed on the disc. When relatively thick layers of rust are encountered, relatively coarse grinding pads are used initially and, upon removal of a major amount of the contaminant layer, fine-grained grinding pads are substituted by replacing the initial grinding chocks with others of greater fineness.

According to another aspect of this invention, the brakeshoes of the installation are not replaced by the grinding chocks but the grinding chocks can be applied against the braking faces of the disc externally on the brake yoke. In these cases, it has been found advantageous to employ a pair of clamping tongs or other clamping means adapted to urge the grinding chocks against the brake faces and entrainable by the disc so as to be brought into abutting relationship against the fixedly positioned yoke which retains the grinding chocks while continued rotation of the disc, induced by the axle of the auxiliary motor mentioned earlier, effectively removes the contaminant or rust layer without, again, dismantling of the disc. In some case, it has been found advantageous to employ a portable grinding unit in which the grinding chocks are mounted and which includes a friction drive for the periphery of the disc. In this case, grinding of the rear-wheel discs of an automotive vehicle is carried out by placing the vehicle transmission in its "netural" or "freewheeling" condition and brinding a friction-drive wheel to rest against the disc. The drive wheel may be rotated by an electric motor and rotates the brake disc at a speed sufficient to ensure fine grinding of the annular braking faces.

The above and other objects, features and advantages will become more readily apparent from the following description, reference being made to the accompanying drawing in which.

Figure 1:
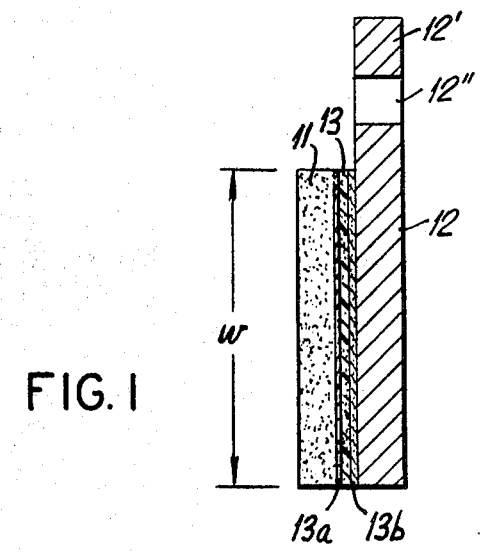
FIG. 1 is a transverse cross-sectional view of a grinding chock in accordance with the present invention.
Figure 2:
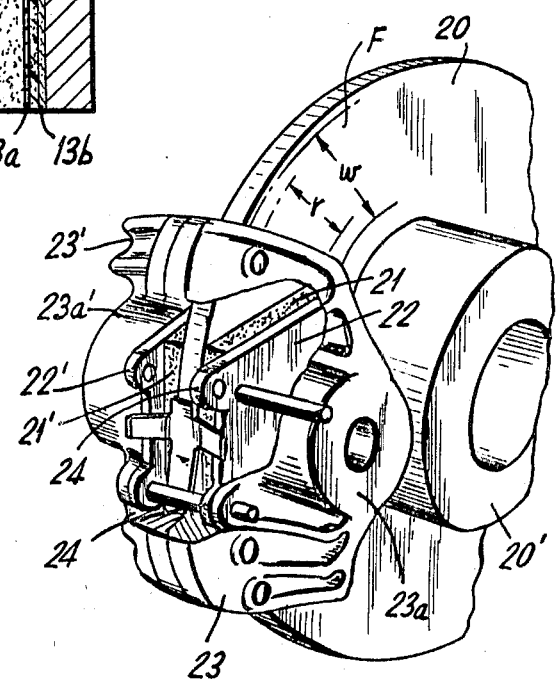
FIG. 2 is a somewhat perspective exploded view showing a brake installations provided with grinding chocks in place of the brakeshoes.

In FIG. 1, we show a grinding chock 1, in accordance with the present invention, which comprises a metallic (e.g. steel) backing plate 12 whose configuration advantageously conforms to the configuration of a braking shoe of a braking installation whose disc is to be ground (see FIG. 2).

Thus, for example, a grinding chock of this type may be substituted for the braking shoes of a disc brake installation as illustrated and described in the commonly assigned U.S. Pat. No. 3,182,754 issued 11 May 1965. The backing plate 12 carries a plaque or pad forming a grindstone 11 and is composed of abrasive particles (i.e. silicon carbide or carborundum) bonded to coherency with an organic binding medium (e.g. of phenolformaldehyde resin such as bakelite) or a ceramic binder (e.g., of baked or sintered clay or of the graphite type). Advantageously, a thermal insulating layer 13 in the form of a sheet or disc of epoxy resin is interposed between the grinding pad 11 and backing plate 12 and is cemented to them by layers 13a and 13b of adhesive. The backing plate 12 is provided with lobes 12' and passages 12" which may receive the spring members normally used to position the brakeshoes when the latter are properly in place in the brake yoke. As can be seen from FIG. 2, the brake yoke normally comprises a pair of yoke members 23 and 23' which may be attached together to bracket the annular braking faces F of a disc 20 passing between the brakeshoes. As illustrated and described in the aforementioned patent, the brakeshoes can be removed without significant disassembly of the yoke and without removal of the brake disc 20, upon whose hub 20' the wheel of the vehicle can be mounted in the usual manner. The yoke 23, 23' is carried by the axle housing of the vehicle in the usual manner. Each yoke half 23, 23' is provided with a wheel cylinder 23a, 23a' which is supplied with hydraulic fluid from a master cylinder (not shown) and shifts the brakeshoes against the braking faces of the disc 20 when the vehicle brake pedal is actuated.

According to one aspect to this invention, as described generally above, a rust or contamination layer along the braking faces F of the disc 20 may be removed by simply replacing the brakeshoes with a pair of grinding chocks similar to the chock illustrated in FIG. 1. Each of the grinding chocks 21, 21' of FIG. 2 has a backing plate 22, 22' whose configuration conforms exactly to the configuration of the backing plate of the brakeshoe, although the radial width w of the grinding pad of each chock exceeds the radial width r or the swath engaged by the linings which are bonded to the backing plates of the brakeshoes in the usual manner. Thus, when the grinding chocks 21, 21' are applied against the braking faces of the disc 20, a radial width W is refinished and ground. According to this invention, the refinishing can be carried out by any one of a number of techniques. It has been found to be advantageous, for example, once the grinding chocks 21 and 21' are substituted for the brakeshoes, to replace the wheel which was removed to afford access to the brakeshoes, and thereupon drive the vehicle along a road surface, while intermittently operating the brake pedal to urge the grinding chocks hydraulically against the faces of the disc. A few applications of the brakes, during which the hydraulic mechanism urges the chocks against the disc, generally suffice to remove all rust and contamination layers. The wheel can then be removed, the grinding chocks withdrawn and replaced by the brakeshoes and the wheel remounted. Note that no disassembly of the yoke or removal of the disc was required.

Figure 4:
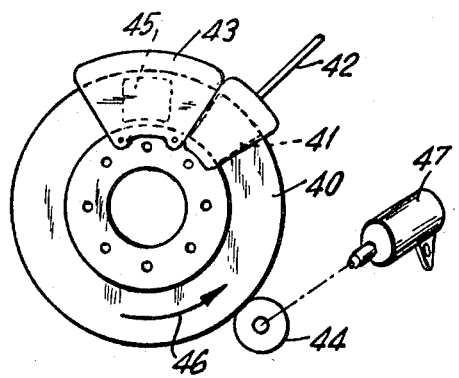
FIG. 4 is a vertical elevational view diagrammatically representing an embodiment of the method of the present invention.

In an alternative arrangement, after the grinding chocks 21, 21' have been substituted for the brakeshoes in the installation of FIG. 2, the disc 20 is driven about its axis by either a friction-wheel drive of the type represented in FIG. 4, or by operating the vehicle engine while supporting the driven end of the vehicle off the ground. Again, actuation of the hydraulic brake system applies the chocks to abrade the rust and contamination layers.

Figure 3:
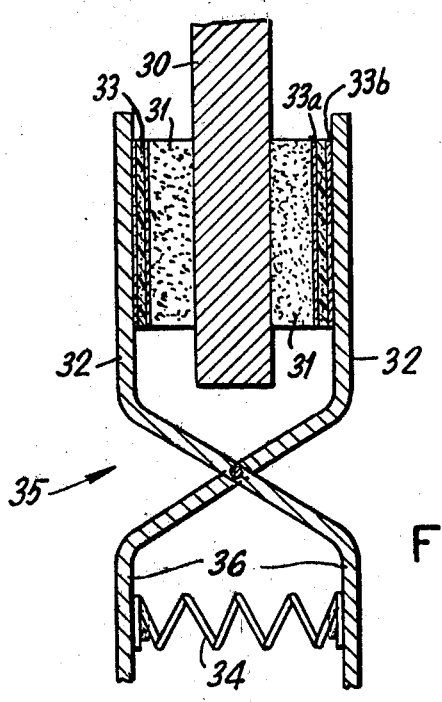
FIG. 3 is a cross-sectional view of another device for grinding the braking faces of a disc according to the present invention.

We have found, moreover, that it may be desirable not to substitute grinding chocks for the brakeshoes because of the inconvenience effectuating such substitution or because the available grinding chocks do not correspond in configuration to the brakeshoes. In this case, we prefer to make use of a system of the type illustrated in FIGS. 3 and 4, in which the grinding pads 31 are mounted upon a pair of elongated members forming a pair of tongs 35. The members 32 are, in this case, bonded to the abrasive pads 31 (whose composition conforms to that of pad 11) via a sheet 33 of thermal insulation which is cemented at 33a and 33b to the respective member 32 and the associated pad. The handles 36 of the tongs 35 are biased outwardly by a spring 34 which applies the force necessary to urge the pads 31 of the grinding chocks against a disc 30. As can be seen from FIG. 4, the clamped assembly 42, whose grinding chocks 41 are of the construction and orientation illustrated in FIG. 3, engages the disc 40 which is rotatable in the direction of arrow 46 about its axis. While this rotation of the disc, especially where the brake of a driven wheel is concerned, can be effected through the axle, we prefer to provide a friction wheel 44, which may be driven by a hand-held unit such as an electric drill as represented at 47. The clamp 42 is rotatably entrained by the disc 40 when it is locked into engagement with the disc and is carried thereby against the yoke 43 of the brake installation whose brakeshoes are diagrammatically represented at 45. Thus, the clamp 42 need not be retained by the operator and urges its pads against the braking faces of the disc, over a swath wider than the radial width thereof as the disc 40 is rotated relatively to the clamp 42 and the yoke 45.

Figure 5:
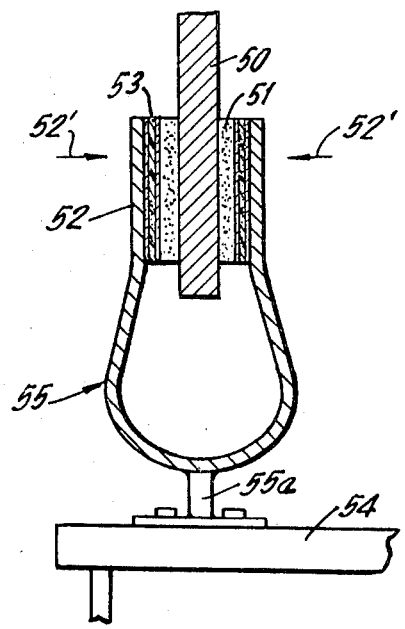
FIG. 5 is a side view of yet another apparatus for carrying out this method.
Figure 6:
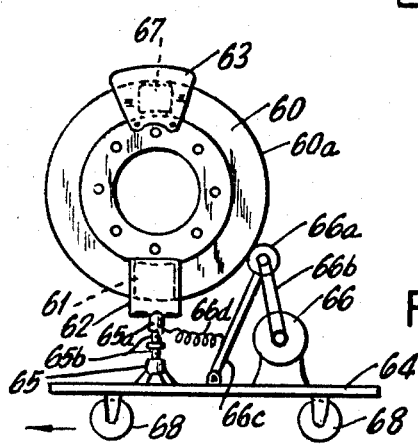
FIG. 6 is a view similar to FIG. 4 of another device.

In FIGS. 5 and 6, we show an arrangement in which the clamping means and the friction drive means are mounted upon a portable platform 64 in the form of a dolly whose wheels are represented at 68. In this arrangement, the friction drive is effected via a wheel 66a driven via a belt 66b from a motor 66 carried by the platform 64. An actuating bar 66c in which the wheel 66a is journaled, is held against the periphery 60a of the brake disc 60 by a spring 66d and can be deflected by hand away from the disc. A stand 65 is fixed to the platform 64 and supports a clamp 62 whose grinding pads 61 are of the composition and construction previously described. The shank 65a of the clamp is connected with the stand 65 via a threaded rod 65b which adjusts the pads 61 radially with respect to the disc. The vehicle can then be jacked up, the wheel removed and the platform 64 moved into position with the disc 60 between the chock 61 and the wheel 66a in frictional engagement with the disc. The motor 66 is then started while the spring clamp 62 holds the chocks against the braking faces of the disc. The yoke of the brake installation is represented at 63 and has brakeshoes 67 which, in this case, need not be replaced. In the arrangement of FIG. 5, the shank 55a of the clamp 55 is mounted on the movable platform 54 while the clamp has the configuration of a pair of tongs. The shanks or members 52 of the tongs are urged by the inward spring bias thereof in the direction of arrows 52' to bring the grinding chocks 51 into contact with the brake disc 50. Insulating layers 53 are provided between the chocks and the members 52.

We claim:

1. An apparatus for cleaning the annular faces of a disc brake comprising a disc brake yoke extending about the periphery of said disc, actuating means for applying a pair of brakeshoes removably receivable in said yoke against said faces, and a pair of grinding chocks removably mounted in said yoke and substituted for said brakeshoes and adapted to be urged against said faces of said disc by said actuating means.

2. An apparatus as defined in claim 1 wherein said grinding chocks each comprises a backing plate and an abrasive layer bonded to said backing plate, said layer being composed of abrasive particles bonded together by an organic or ceramic binder.

3. An apparatus as defined in claim 2 wherein said layer has a width greater than the radial width of said braking faces.

4. An apparatus as defined in claim 2 further comprising a layer of thermal insulation interposed between the abrasive layer and said backing plate.

5. An apparatus as defined in claim 4 wherein said layer of thermal insulation is a sheet of a synthetic resin cemented to the abrasive layer and to the backing plate, respectively.

6. An apparatus for cleaning the annular braking faces of a disc brake disc comprising clamping means having a pair of members adapted to receive said disc between them, a pair of flat grinding chocks respectively mounted on said members and engageable on the respective faces of said disc, means for urging said grinding chocks against said faces while said disc is rotated between them, and friction-drive means engageable with said disc for rotating same relatively to said clamping means.

7. An apparatus as defined in claim 6 wherein said friction-drive means and said clamping means are mounted upon a common portable support.

8. An apparatus as defined in claim 6 wherein said clamping means is freely movable with said disc and said disc is provided with a yoke retaining said clamping means upon its entrainment with said disc while said disc rotates between said chocks, said clamping means being formed as a pair of tongs resiliently urging said chocks against said faces.